US011541697B2

(12) United States Patent
Li (10) Patent No.: US 11,541,697 B2
(45) Date of Patent: Jan. 3, 2023

(54) HEAVY-DUTY PNEUMATIC TIRE (71) Applicant: SUMITOMO RUBBER INDUSTRIES, LTD., Hyogo (JP)

(72) Inventor: Qingmao Li, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 0 days.

(21) Appl. No.: 17/016,826

(22) Filed: Sep. 10, 2020

(65) Prior Publication Data
US 2021/0070109 A1  Mar. 11, 2021

(30) Foreign Application Priority Data

Sep. 11, 2019 (JP) ............................. JP2019-165450

(51) Int. Cl.
  *B60C 15/06* (2006.01)
  *B60C 15/00* (2006.01)
  *B60C 9/02* (2006.01)

(52) U.S. Cl.
  CPC .......... *B60C 15/0036* (2013.01); *B60C 15/06* (2013.01); *B60C 2009/0276* (2013.01); *B60C 2009/0284* (2013.01); *B60C 2015/009* (2013.01)

(58) Field of Classification Search
  CPC .............................................. B60C 2015/044
  See application file for complete search history.

(56) References Cited

U.S. PATENT DOCUMENTS

| | | | | |
|---|---|---|---|---|
| 6,079,467 A | * | 6/2000 | Ueyoko | B60C 15/06 152/554 |
| 8,448,683 B2 | | 5/2013 | Yamazaki | |
| 2001/0050129 A1 | * | 12/2001 | Ohara | B60C 15/06 152/547 |
| 2008/0190539 A1 | * | 8/2008 | Ferlin | B60C 15/0027 152/539 |
| 2012/0211138 A1 | * | 8/2012 | Johnson | B60C 15/06 152/526 |
| 2019/0143760 A1 | * | 5/2019 | Kanaya | B60C 15/0045 152/554 |
| 2020/0016934 A1 | * | 1/2020 | Kagimoto | B60C 9/1835 |

FOREIGN PATENT DOCUMENTS

| | | | | |
|---|---|---|---|---|
| JP | 2001206027 A | * | 7/2001 | |
| JP | 2004142478 A | * | 5/2004 | ............ B29D 30/50 |
| JP | 2011-51568 | | 3/2011 | |
| JP | 2017218065 A | * | 12/2017 | |

* cited by examiner

*Primary Examiner* — Cedrick S Williams
(74) *Attorney, Agent, or Firm* — Greenblum & Bernstein, P.L.C.

(57) ABSTRACT

Provided is a heavy-duty pneumatic tire in which not only occurrence of a damage of CBU but also occurrence of pulling-out of a carcass ply can be inhibited, and which has excellent durability. In the tire, beads each include a cover enclosing at least a part of a core. The cover is located, between the core and the carcass ply, in a portion at which the carcass ply encloses the core. The cover is composed of one cover ply including a large number of aligned cover cords and a cover topping rubber covering the cover cords. A ratio of a distance between the cover cords to an outer diameter of a carcass cord is not lower than 0.35 and not higher than 0.85. A difference between a hardness of the cover topping rubber and a hardness of a carcass topping rubber is not less than −5 and not greater than 5.

12 Claims, 5 Drawing Sheets

HEAVY-DUTY PNEUMATIC TIRE

BACKGROUND OF THE INVENTION

Field of the Invention

The present invention relates to a heavy-duty pneumatic tire.

Description of the Background Art

Portions of a tire that are fitted to a rim (hereinafter, referred to also as "fitted portions") include beads. Each bead includes a core, and the core is formed by winding a wire made of steel. A carcass extends on and between one of the beads and the other bead. The carcass is composed of at least one carcass ply, and the carcass ply is turned up around the core. A steel cord is ordinarily used as a carcass cord for tires to be mounted to vehicles such as trucks and buses, i.e., heavy-duty tires.

Force is exerted to each fitted portion of the tire so as to cause the core and the carcass cord to come close to each other. Heavy-duty tires are used under high internal pressure and high load. Therefore, there is a concern that fretting between the core and the carcass cord occurs and a damage that involves a break of the carcass cord (Cord Broken Up: CBU) occurs. In order to improve the durabilities of tires, studies regarding prevention of a damage of CBU have been conducted (for example, Japanese Laid-Open Patent Publication No. 2011-51568).

In a tire described in Japanese Laid-Open Patent Publication No. 2011-51568, cores are enclosed by wrapping materials. Accordingly, each wrapping material is disposed between a carcass ply and the corresponding core.

Since the wrapping material is disposed between the carcass ply and the core, the distance between the carcass ply and the core is ensured. Thus, in the tire described in the aforementioned Japanese Laid-Open Patent Publication No. 2011-51568, fretting between the core and a carcass cord is prevented, and occurrence of a damage of CBU is inhibited.

However, since the core is wrapped by the wrapping material, a core portion apparently has a large outer diameter. The core is rotated by tensile force exerted to the carcass ply, and rotational movement of the core portion is greater than that of the core alone. Therefore, there is a concern that a damage that involves peeling (bead core looseness) occurs between the core and the carcass ply depending on the degree of shear strain that is generated between the core and the carcass ply. In this case, the integrity between the core and the carcass ply cannot be maintained. Thus, a portion of the carcass ply that is located around the core, i.e., a turned-up portion of the carcass ply, may be pulled out owing to tensile force exerted to the carcass ply.

SUMMARY OF THE INVENTION

The present invention has been made in consideration of these circumstances, and an object of the present invention is to provide a heavy-duty pneumatic tire in which not only occurrence of a damage of CBU but also occurrence of pulling-out of a carcass ply can be inhibited, and which has excellent durability.

A heavy-duty pneumatic tire according to one mode of the present invention includes: a pair of beads; and a carcass extending on and between one of the beads and another bead. Each bead includes a core, an apex located radially outward of the core, and a cover enclosing at least a part of the core. The carcass includes a carcass ply including a large number of aligned carcass cords and further including a carcass topping rubber covering the carcass cords. Each carcass cord is a steel cord, and the carcass ply is turned up around the core from an inner side to an outer side in an axial direction. The cover is located, between the core and the carcass ply, in a portion at which the carcass ply encloses the core. The cover is composed of one cover ply including a large number of aligned cover cords and further including a cover topping rubber covering the cover cords. Each cover cord is a cord formed from an organic fiber. A ratio of a distance between the cover cords to an outer diameter of each carcass cord is not lower than 0.35 and not higher than 0.85. A difference between a hardness of the cover topping rubber and a hardness of the carcass topping rubber is not less than −5 and not greater than 5.

It is preferable that, in the heavy-duty pneumatic tire, the hardness of the cover topping rubber is lower than the hardness of the carcass topping rubber.

It is preferable that, in the heavy-duty pneumatic tire, the hardness of the cover topping rubber is not lower than 62 and not higher than 75.

It is preferable that, in the heavy-duty pneumatic tire, a thickness of the cover ply is not smaller than 0.7 mm and not larger than 1.4 mm.

It is preferable that, in the heavy-duty pneumatic tire, a thickness of each cover cord is not lower than 700 dtex and not higher than 1300 dtex.

It is preferable that, in the heavy-duty pneumatic tire, an angle of each cover cord relative to a circumferential direction is not smaller than 25° and not larger than 75°.

It is preferable that the heavy-duty pneumatic tire further includes a pair of chafers located axially outward of the beads. A hardness of each chafer is equal to the hardness of the carcass topping rubber or higher than the hardness of the carcass topping rubber.

In the heavy-duty pneumatic tire according to the present invention, not only occurrence of a damage of CBU but also occurrence of pulling-out of the carcass ply is inhibited. Therefore, the tire has excellent durability.

DESCRIPTION OF THE PREFERRED EMBODIMENTS

Hereinafter, the present invention will be described in detail based on preferred embodiments with appropriate reference to the drawings.

In the present invention, a state where a tire is mounted to a normal rim, the internal pressure of the tire is adjusted to a normal internal pressure, and no load is applied to the tire, is referred to as a normal state. In the present invention, the dimensions and the angles of components of the tire are measured in the normal state unless otherwise specified.

The normal rim means a rim that is specified in a standard on which the tire is based. The "standard rim" in the JATMA standard, the "Design Rim" in the TRA standard, and the "Measuring Rim" in the ETRTO standard, are normal rims.

The normal internal pressure means an internal pressure that is specified in a standard on which the tire is based. The "maximum air pressure" in the JATMA standard, the "maximum value" indicated in "TIRE LOAD LIMITS AT VARIOUS COLD INFLATION PRESSURES" in the TRA standard, and the "INFLATION PRESSURE" in the ETRTO standard, are normal internal pressures.

A normal load means a load that is specified in a standard on which the tire is based. The "maximum load capacity" in the JATMA standard, the "maximum value" indicated in "TIRE LOAD LIMITS AT VARIOUS COLD INFLATION PRESSURES" in the TRA standard, and the "LOAD CAPACITY" in the ETRTO standard, are normal loads.

Figure 1:
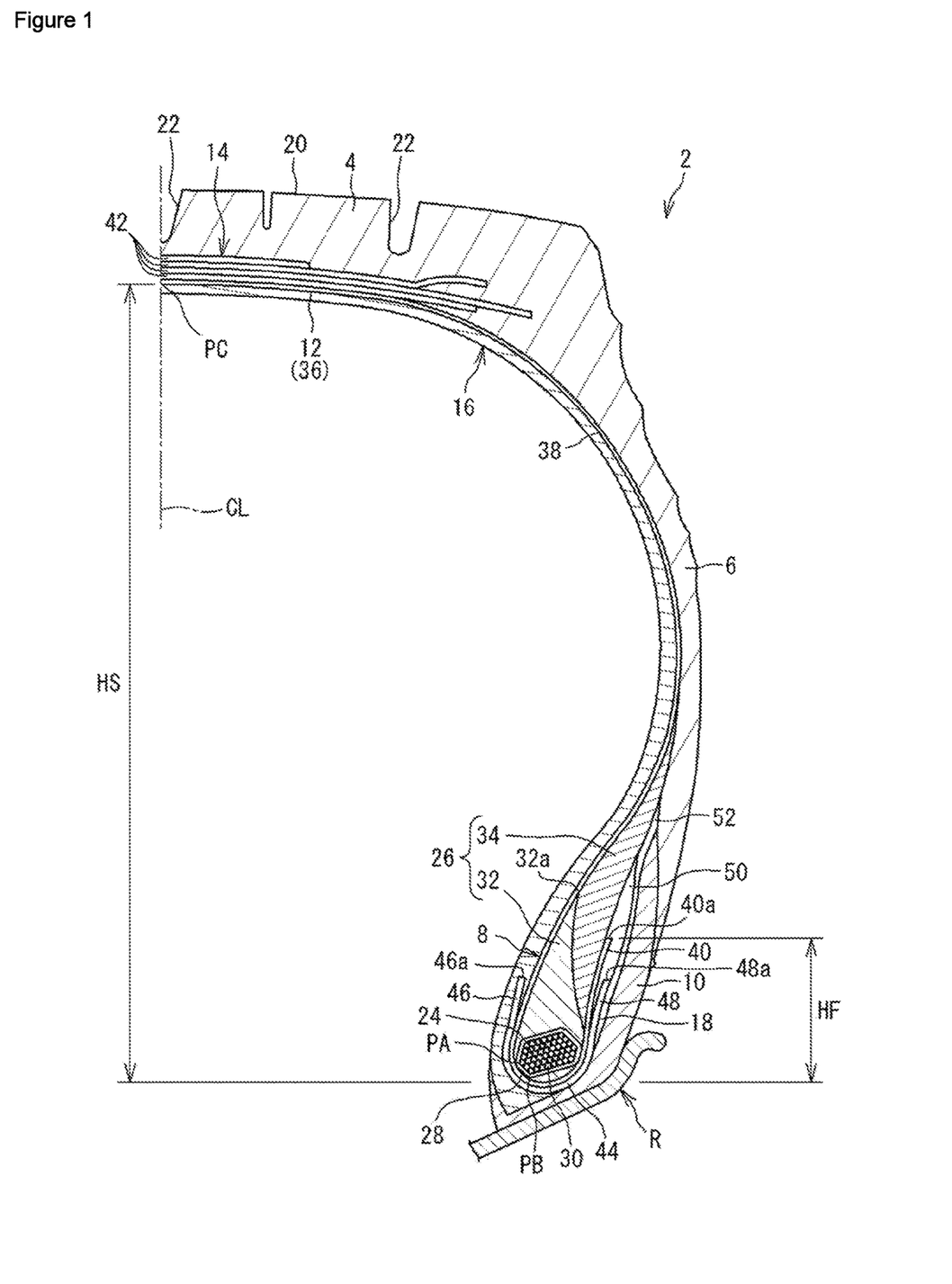
FIG. 1 is a partial cross-sectional view of a heavy-duty pneumatic tire according to an embodiment of the present invention.

FIG. 1 shows a part of a heavy-duty pneumatic tire 2 according to an embodiment of the present invention (hereinafter, sometimes referred to simply as "tire 2"). The tire 2 is mounted to a vehicle such as a truck or a bus. The tire 2 shown in FIG. 1 is mounted to a rim R. The rim R is a normal rim.

FIG. 1 shows a partial cross section of the tire 2 taken along a plane that includes a rotation axis of the tire 2. In FIG. 1, the right-left direction is the axial direction of the tire 2, and the up-down direction is the radial direction of the tire 2. A direction perpendicular to the sheet surface of FIG. 1 is the circumferential direction of the tire 2. In FIG. 1, the alternate long and short dash line CL indicates an equator plane of the tire 2.

In FIG. 1, the solid line BBL extending in the axial direction is a bead base line. The bead base line is a line that defines the diameter of the rim R (refer to the JATMA standard or the like).

The tire 2 includes a tread 4, a pair of sidewalls 6, a pair of beads 8, a pair of chafers 10, a carcass 12, a belt 14, an inner liner 16, and a pair of reinforcing layers 18.

The tread 4 is formed from crosslinked rubber. The tread 4 is, at an outer surface 20 thereof (i.e., tread surface 20), brought into contact with a road surface. In the tire 2, at least three circumferential grooves 22 are formed in the tread 4.

Each sidewall 6 connects to the corresponding end of the tread 4. The sidewall 6 extends radially inward from the end of the tread 4. The sidewall 6 is formed from crosslinked rubber.

Each bead 8 is located radially inward of the corresponding sidewall 6. The bead 8 includes a core 24, an apex 26, and a cover 28.

The core 24 extends in a circumferential direction. The core 24 includes wound wires 30 made of steel. In the core 24, each wire 30 extends in the circumferential direction. A cross-sectional shape of the core 24 has round corners and six sides. The core 24 has a hexagonal cross-sectional shape. In the tire 2, the cross-sectional shape of the core 24 is not particularly limited, and the cross-sectional shape may be quadrangular or circular.

In FIG. 1, the corner indicated by the reference character PA is the axially inner end of the core 24, and the corner indicated by the reference character PB is the radially inner end of the core 24. The axially inner end PA and the radially inner end PB are specified based on the cross-sectional shape, of the core 24, that is formed by a bunch of cross sections of the wires 30.

The cover 28 encloses at least a part of the core 24. In the tire 2, the cover 28 encloses the entire core 24 as shown in FIG. 1. The cover 28 encloses the core 24 and binds the spirally wound wires 30. The cover 28 prevents the bunch of wound wires 30 from being undone.

The apex 26 is located radially outward of the core 24. The apex 26 includes an inner apex 32 and an outer apex 34. The inner apex 32 extends radially outward from the core 24. The inner apex 32 is tapered toward an outer side in the radial direction. The outer apex 34 is located radially outward of the inner apex 32. The outer apex 34 has a large thickness at a portion thereof on which an outer end 32a of the inner apex 32 is located. An outer portion of the outer apex 34 is tapered toward the outer side in the radial direction, and an inner portion of the outer apex 34 is tapered toward an inner side in the radial direction.

In the tire 2, the inner apex 32 and the outer apex 34 are formed from crosslinked rubber. In the tire 2, the hardness Hu of the inner apex 32 is not lower than 80 and not higher than 95. The hardness Hs of the outer apex 34 is not lower than 50 and not higher than 65. The outer apex 34 is softer than the inner apex 32.

In the tire 2, the hardness of each element forming the tire 2 such as the aforementioned inner apex 32 and outer apex 34 is measured according to a standard of JIS K6253 with use of a type A durometer under a temperature condition of 23° C.

Each chafer 10 is located axially outward of the corresponding bead 8. The chafer 10 is located radially inward of the corresponding sidewall 6. The chafer 10 is brought into contact with the rim R.

The chafer 10 is formed from crosslinked rubber. The chafer 10 is softer than the inner apex 32 and harder than the outer apex 34. In the tire 2, the hardness Hc of the chafer 10 is not lower than 60 and not higher than 85.

The carcass 12 is located inward of the tread 4, the sidewall 6, and the chafer 10. The carcass 12 extends on and between one of the beads 8 and the other bead 8. The carcass 12 includes at least one carcass ply 36. The carcass 12 of the tire 2 is composed of one carcass ply 36.

The carcass ply 36 is turned up around each core 24 from an inner side to an outer side in the axial direction. The carcass ply 36 has: a ply body 38 extending on and between one of the cores 24 and the other core 24; and a pair of turned-up portions 40 connecting to the ply body 38 and turned up around the respective cores 24 from the inner side to the outer side in the axial direction. In the tire 2, an end 40a of each turned-up portion 40 is located radially inward of the outer end 32a of the corresponding inner apex 32.

In FIG. 1, the reference character PC indicates the intersection point between the equator plane and the inner surface of the carcass 12. The double-headed arrow HS indicates the distance in the radial direction between the bead base line and the intersection point PC. The distance HS in the radial direction is the height of a cross section of the carcass 12. In FIG. 1, the double-headed arrow HF indicates the distance in the radial direction between the bead base line and the end 40a of the turned-up portion 40. The distance HF in the radial direction is the height of the turned-up portion 40.

In the tire 2, the ratio of the height HF of the turned-up portion 40 to the height HS of the cross section of the carcass 12 (HF/HS) is preferably not lower than 0.15 from the viewpoint of inhibiting the turned-up portion 40 from being pulled out. The ratio (HF/HS) is preferably not higher than 0.25 from the viewpoint of inhibiting strain from being concentrated at the end 40a of the turned-up portion 40.

Although not shown, the carcass ply 36 includes a large number of aligned carcass cords. Each carcass cord intersects with the equator plane. The angle of the carcass cord relative to the equator plane is not smaller than 70° and not larger than 90°.

The carcass cord is a steel cord. In the tire 2, a steel cord generally used as a tire cord is used as the carcass cord. In the tire 2, the outer diameter of the carcass cord, i.e., a cord diameter, is not smaller than 0.65 mm and not larger than 1.50 mm. In a case where the steel cord as the carcass cord is obtained by twisting a plurality of element wires together, the cord diameter is expressed by the diameter of a circle circumscribing the element wires.

The belt 14 is located radially inward of the tread 4. The belt 14 is located radially outward of the carcass 12.

The belt 14 is composed of a plurality of belt plies 42 stacked in the radial direction. The belt 14 of the tire 2 is composed of four belt plies 42. In the tire 2, the number of belt plies 42 composing the belt 14 is not particularly limited. The configuration of the belt 14 is determined as appropriate in consideration of the specifications of the tire 2.

Although not shown, each belt ply 42 includes a large number of aligned belt cords. The belt cords are covered with a topping rubber. The material of each belt cord is steel. The belt cord is tilted relative to the equator plane.

The inner liner 16 is located inward of the carcass 12. The inner liner 16 is formed from crosslinked rubber. The inner liner 16 maintains the internal pressure of the tire 2.

Each reinforcing layer 18 is located at the corresponding bead 8 portion. The reinforcing layer 18 is, on the inner side of the carcass 12, turned up along the carcass 12 around the core 24 from the inner side to the outer side in the axial direction. The reinforcing layer 18 has: a bottom portion 44 located radially inward of the core 24; an inner portion 46 connecting to one end of the bottom portion 44 and extending substantially outward in the radial direction; and an outer portion 48 connecting to the other end of the bottom portion 44 and extending substantially outward in the radial direction. The inner portion 46 is located axially inward of the ply body 38, and the outer portion 48 is located axially outward of the turned-up portion 40.

The tire 2 may be configured such that the reinforcing layer 18 is not turned up around the core 24 but covers, from the outer side, a radially inner portion and an axially outer portion of the bead 8 with the carcass ply 36 therebetween. The tire 2 may also be configured such that the reinforcing layer 18 covers, from the outer side, only the axially outer portion of the bead 8 with the carcass ply 36 therebetween.

Although not shown, the reinforcing layer 18 includes a large number of aligned filler cords. Each filler cord is a steel cord. The reinforcing layer 18 is referred to also as a reinforcing steel layer.

In the tire 2, a strip 50 and an inner sidewall 52 are disposed between the bead 8 and the chafer 10. The strip 50 is formed from crosslinked rubber and covers the end 40a of the turned-up portion 40 from the axially outer side. The inner sidewall 52 is formed from crosslinked rubber and covers the strip 50 and an end 48a of the outer portion 48 from the axially outer side.

Figure 2:
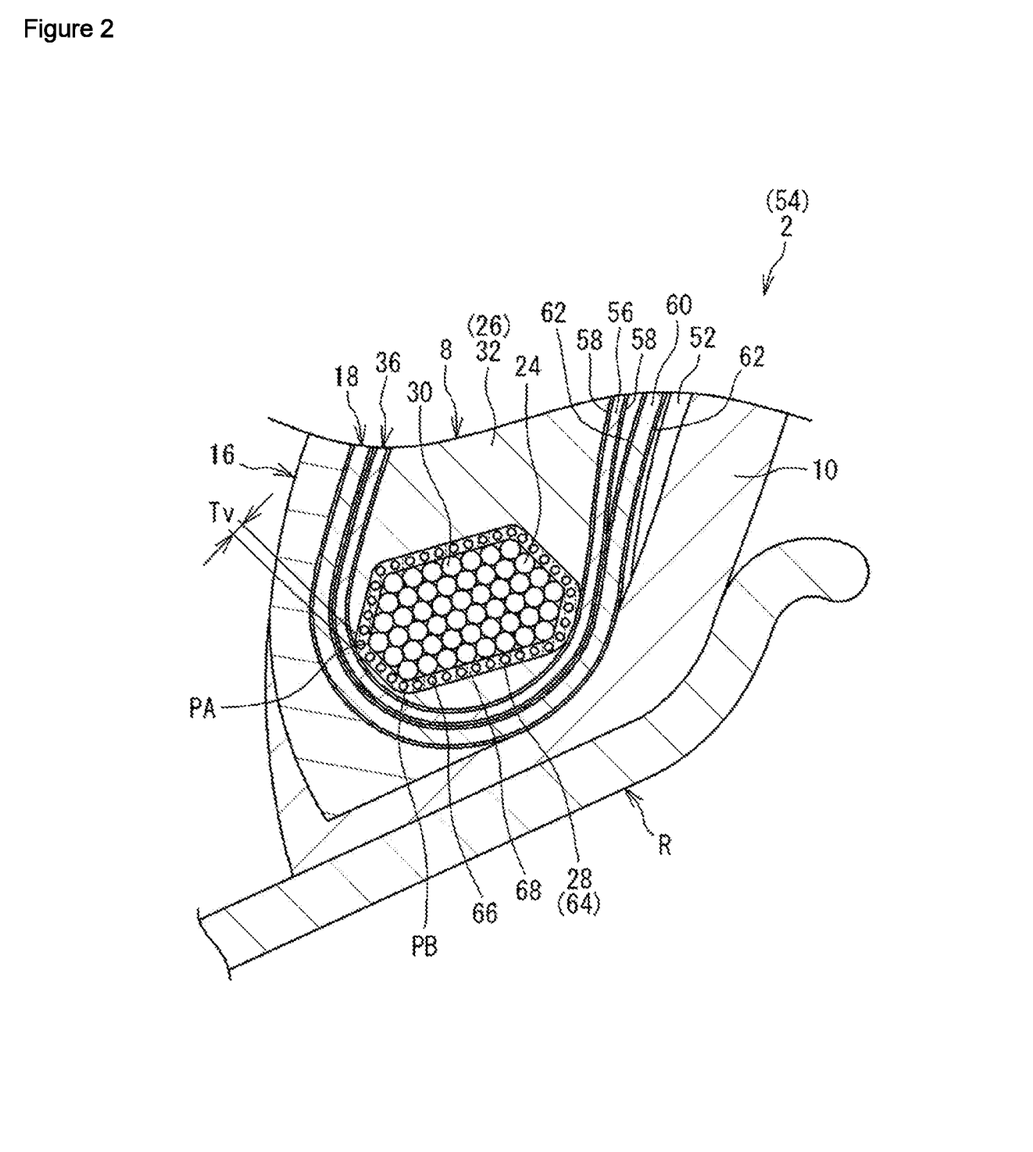
FIG. 2 is an enlarged cross-sectional view of a fitted portion of the tire in FIG. 1.

FIG. 2 shows the bead 8 portion (hereinafter, referred to also as "fitted portion 54") of the tire 2 shown in FIG. 1. FIG. 2 shows, in an enlarged manner, a core 24 portion included in the fitted portion 54.

As shown in FIG. 2, in the carcass ply 36, the carcass cords 56 are covered with a carcass topping rubber 58. The carcass ply 36 includes: the large number of aligned carcass cords 56; and the carcass topping rubber 58 covering the carcass cords 56. The carcass topping rubber 58 is formed from crosslinked rubber. In the tire 2, the hardness Ht of the carcass topping rubber 58 is not lower than 68 and not higher than 85.

In the reinforcing layer 18, the filler cords 60 are covered with a filler topping rubber 62. The reinforcing layer 18 includes: the large number of aligned filler cords 60; and the filler topping rubber 62 covering the filler cords 60. The filler topping rubber 62 is formed from crosslinked rubber. In the tire 2, the material of the filler topping rubber 62 is the same as the material of the carcass topping rubber 58.

As shown in FIG. 2, in the tire 2, the cover 28 is composed of one cover ply 64. The cover ply 64 includes: a large number of aligned cover cords 66; and a cover topping rubber 68 covering the cover cords 66. The cover topping rubber 68 is formed from crosslinked rubber.

In the tire 2, each cover cord 66 is a cord formed from an organic fiber. Examples of the organic fiber include nylon fibers, rayon fibers, polyester fibers, and aramid fibers.

Figure 3:
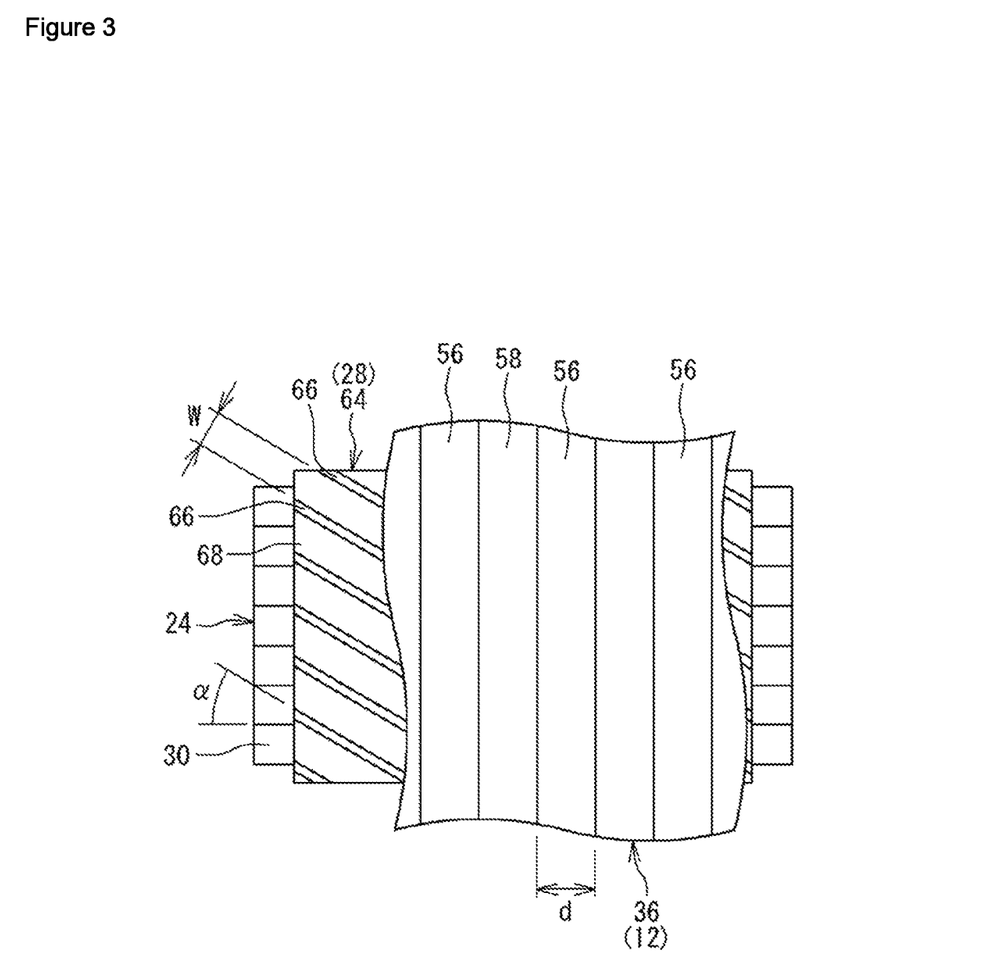
FIG. 3 is a schematic diagram for explaining arrangement of cover cords.

FIG. 3 shows the configuration of the cover 28 as well as that of the carcass ply 36. In FIG. 3, the right-left direction is the circumferential direction of the tire 2, and the up-down direction is the radial direction of the tire 2. For convenience of description, the cover cords 66 covered with the cover topping rubber 68 and the carcass cords 56 covered with the carcass topping rubber 58 are indicated by solid lines in FIG. 3.

In the cover 28 of the tire 2, the large number of aligned cover cords 66 are arranged at predetermined intervals. In FIG. 3, the double-headed arrow W indicates the interval between the cover cords 66, i.e., the distance between the cover cords 66. The double-headed arrow d indicates the outer diameter of each carcass cord 56.

In the tire 2, when tensile force is exerted to the carcass ply 36, force is exerted so as to cause the carcass ply 36 to come close to the core 24. In the tire 2, the cover 28 is located, between the core 24 and the carcass ply 36, in a portion at which the carcass ply 36 encloses the core 24. Since the cover 28 is interposed between the core 24 and the carcass ply 36, fretting between the core 24 and the carcass cord 56 is prevented.

In the tire 2, in particular, the distance W between the cover cords 66 is shorter than the outer diameter d of the carcass cord 56. Specifically, the ratio of the distance W between the cover cords 66 to the outer diameter d of the carcass cord 56 (W/d) is not higher than 0.85. Accordingly, the carcass cord 56 is inhibited from sinking into a portion between the cover cords 66. Thus, the distance between the core 24 and the carcass cord 56 is ensured, whereby fretting between the core 24 and the carcass cord 56 is effectively prevented. Therefore, occurrence of a damage of CBU is inhibited in the tire 2. From this viewpoint, the ratio (W/d) is preferably not higher than 0.75 and more preferably not higher than 0.70.

In the tire 2, the ratio of the distance W between the cover cords 66 to the outer diameter d of the carcass cord 56 (W/d) is not lower than 0.35. Accordingly, the volume of the cover topping rubber 68 between the cover cords 66 is ensured, whereby the cover cords 66 are stably retained by the cover 28 in the tire 2. Thus, the cover cords 66 are prevented from peeling, whereby the cover 28 contributes to prevention of fretting between the core 24 and the carcass cord 56. Therefore, occurrence of a damage of CBU is inhibited in the tire 2. From this viewpoint, the ratio (W/d) is preferably not lower than 0.45 and more preferably not lower than 0.50.

As described above, in the tire 2, the cover 28 wrapping the core 24 is composed of the one cover ply 64. The cover 28 is thinner than a cover composed of two or more cover plies 64 or a cover obtained by winding the cover ply 64 for two or more turns. Since the outer diameter of a portion formed by the core 24 and the cover 28 wrapping the core 24 is appropriately maintained, the tire 2 allows suppression of rotational movement of the core 24 in a running state. Thus, the thin cover 28 contributes to inhibition of occurrence of bead core looseness.

Meanwhile, in the tire 2, the core 24 includes the wires 30 made of steel, and a steel cord is used as each carcass cord 56. In the tire 2, the cover 28 and the carcass topping rubber 58 are located between the core 24 and the carcass cord 56 which are hard. As described above, the thin cover 28 is used in the tire 2. Therefore, even though the employment of the thin cover 28 allows inhibition of rotation of the core 24, there is a concern that damage occurs between the core 24 and the carcass cord 56 depending on the degree of shear strain generated between the core 24 and the carcass cord 56.

However, in the tire 2, the difference between the hardness Hv of the cover topping rubber 68 and the hardness Ht of the carcass topping rubber 58 (Hv-Ht) is not less than −5 and not greater than 5. The difference (Hv-Ht) falls within the predetermined range, and thus, in the tire 2, a portion between the core 24 and the carcass cord 56 can contribute as a whole to reduction in shear strain generated between the core 24 and the carcass cord 56. Therefore, in the tire 2, damage is inhibited from occurring between the core 24 and the carcass cord 56.

In the tire 2, the integrity between the core 24 and the carcass ply 36 is maintained. Accordingly, even when tensile force is exerted to the carcass ply 36, a portion of the carcass ply 36 disposed around the core 24, specifically, the turned-up portion 40, is stably retained. Thus, in the tire 2, the carcass ply 36 is inhibited from being pulled out. As described above, in the tire 2, occurrence of a damage of CBU is also inhibited. That is, in the tire 2, not only occurrence of a damage of CBU but also occurrence of pulling-out of the carcass ply 36 is inhibited. Therefore, the tire 2 has excellent durability.

In the tire 2, the hardness Hv of the cover topping rubber 68 is lower than the hardness Ht of the carcass topping rubber 58. Accordingly, a part, on the core 24 side, of the portion between the core 24 and the carcass cord 56 particularly effectively contributes to reduction in shear strain. Thus, damage is effectively inhibited from occurring between the core 24 and the carcass cord 56, whereby the durability of the tire 2 can be further improved. From this viewpoint, the hardness Hv of the cover topping rubber 68 is preferably lower than the hardness Ht of the carcass topping rubber 58.

In the tire 2, the hardness Hv of the cover topping rubber 68 is preferably not lower than 62, and meanwhile, preferably not higher than 75. If the hardness Hv is set to be 62 or higher, the rigidity of the cover 28 is sufficiently ensured. Therefore, in the tire 2, favorable durability is maintained. From this viewpoint, the hardness Hv is more preferably not lower than 65 and further preferably not lower than 68. If the hardness Hv is set to be 75 or lower, abnormal strain is inhibited from being generated between the core 24 and the carcass cord 56. Therefore, in the tire 2, the integrity between the core 24 and the carcass ply 36 is effectively maintained. From this viewpoint, the hardness Hv is more preferably not higher than 74.

In FIG. 2, the double-headed arrow Tv indicates the thickness of the cover ply 64. In the tire 2, the thickness Tv of the cover ply 64 is expressed by the thickness of a portion of the cover ply 64 that is located between the axially inner end PA and the radially inner end PB of the core 24. Since the cover 28 of the tire 2 is composed of the one cover ply 64, the thickness Tv is the thickness of the cover 28.

In the tire 2, the thickness Tv of the cover ply 64 is preferably not smaller than 0.7 mm, and meanwhile, preferably not larger than 1.4 mm. If the thickness Tv is set to be 0.7 mm or larger, the distance between the core 24 and the carcass cord 56 is appropriately ensured. Thus, the cover 28 contributes to prevention of fretting between the core 24 and the carcass cord 56. From this viewpoint, the thickness Tv is more preferably not smaller than 0.8 mm. If the thickness Tv is set to be 1.4 mm or smaller, rotation of the core 24 is effectively inhibited. Thus, the cover 28 contributes to inhibition of occurrence of bead core looseness. From this viewpoint, the thickness Tv is more preferably not larger than 1.2 mm.

As described above, in the tire 2, each cover cord 66 is a cord formed from an organic fiber. In the tire 2, the thickness of the cover cord 66 is preferably not lower than 700 dtex, and meanwhile, preferably not higher than 1300 dtex. In the tire 2, the thickness of the cover cord 66 is indicated according to "Fineness Based on Corrected Mass of Cord" in the standards of JIS L1017.

In the tire 2, if the thickness of the cover cord 66 is set to be 700 dtex or higher, the cover cord 66 has an adequate thickness. Thus, the cover cord 66 contributes to prevention of fretting between the core 24 and the carcass cord 56. From this viewpoint, the thickness of the cover cord 66 is more preferably not lower than 800 dtex. If the thickness of the cover cord 66 is set to be 1300 dtex or lower, the thickness Tv of the cover 28 is maintained at an appropriate value. Accordingly, rotation of the core 24 is inhibited, whereby occurrence of bead core looseness is effectively inhibited. From this viewpoint, the thickness of the cover cord 66 is more preferably not higher than 1200 dtex.

In FIG. 3, the angle α is the angle of the cover cord 66 relative to the circumferential direction. In the tire 2, the angle α of the cover cord 66 relative to the circumferential direction is preferably not smaller than 25°, and meanwhile, preferably not larger than 75°.

If the angle α is set to be 25° or larger, the cover cord 66 is inhibited from sinking into a portion between the wires 30 forming the core 24. Accordingly, in the tire 2, the cover 28 contributes to prevention of fretting between the core 24 and the carcass cord 56. From this viewpoint, the angle α is more preferably not smaller than 35°. If the angle α is set to be 75° or smaller, the carcass cord 56 is inhibited from sinking into the portion between the cover cords 66. In this case as well, the cover 28 can contribute to prevention of fretting between the core 24 and the carcass cord 56. From this viewpoint, the angle α is more preferably not larger than 65°.

As described above, the tire 2 includes the pair of reinforcing layers 18 including the large number of aligned filler cords 60. The reinforcing layer 18 shown in FIG. 1 is, on the inner side of the carcass 12, turned up along the carcass 12 around the core 24 from the inner side to the outer side in the axial direction. Each filler cord 60 is a steel cord. The reinforcing layer 18 effectively restricts movement of the core 24. Accordingly, rotation of the core 24 is inhibited, and thus occurrence of bead core looseness is effectively inhibited. From this viewpoint, it is preferable that: the tire 2 includes the pair of reinforcing layers 18 including the large number of aligned filler cords 60; each reinforcing layer 18 is, on the inner side of the carcass 12, turned up along the carcass 12 around the corresponding core 24 from the inner side to the outer side in the axial direction; and each filler cord 60 is a steel cord. From the viewpoint of being able to more effectively restrict the movement of the core 24, an end 46a of the inner portion 46 and the end 48a of the outer portion 48 of the reinforcing layer 18 are more preferably located radially outward of the core 24. From the viewpoint of appropriately maintaining the rigidity of the fitted portion 54, the end 46a of the inner portion 46 and the end 48a of the outer portion 48 of the reinforcing layer 18 are preferably located radially inward of the outer end 32a of the inner apex 32.

In the tire 2, it is preferable that the hardness Hc of each chafer 10 is equal to the hardness Ht of the carcass topping rubber 58 or higher than the hardness Ht of the carcass topping rubber 58.

As described above, in the tire 2, the difference between the hardness Hv of the cover topping rubber 68 and the hardness Ht of the carcass topping rubber 58 (Hv-Ht) is not less than −5 and not greater than 5, and the hardness Hv of the cover topping rubber 68 is preferably lower than the hardness Ht of the carcass topping rubber 58. Accordingly, since the hardness Hc of the chafer 10 is equal to the hardness Ht of the carcass topping rubber 58 or higher than the hardness Ht of the carcass topping rubber 58, the rigidity of the fitted portion 54 is set in a balanced manner. In particular, the cover topping rubber 68 and the carcass topping rubber 58 located between the core 24 and the carcass cord 56 can effectively contribute to suppression of shear strain, whereby the durability of the tire 2 is further improved. From this viewpoint, the hardness Hc of the chafer 10 is preferably higher than the hardness Ht of the carcass topping rubber 58. From the viewpoint of setting the rigidity of the fitted portion 54 in a more balanced manner, it is more preferable that: the hardness Hc of the chafer 10 is higher than the hardness Ht of the carcass topping rubber 58; and the hardness Hv of the cover topping rubber 68 is lower than the hardness Ht of the carcass topping rubber 58.

In the case where the hardness Hc of the chafer 10 is higher than the hardness Ht of the carcass topping rubber 58, the difference between the hardness Hc of the chafer 10 and the hardness Ht of the carcass topping rubber 58 (Hc-Ht) is preferably not less than 1, and meanwhile, preferably not greater than 10 from the viewpoint of setting the rigidity of the fitted portion 54 in a balanced manner.

The tire 2 described above is produced as follows. A producing method for the tire 2 includes: a forming step of combining the elements composing the tire 2, to prepare a tire 2 in an unvulcanized state (hereinafter, "green tire"); and a vulcanizing step of pressurizing and heating the green tire in a mold (not shown).

In the producing method, the green tire is pressurized and heated in the mold in the vulcanizing step. In the tire 2, the cover 28 is located between the core 24 and the carcass cord 56. Therefore, there is the following concern. With the cover topping rubber 68, which is included in the green tire, being in an unvulcanized state, the cover topping rubber 68 flows in the vulcanizing step, and thus no cover 28 having an appropriate thickness Tv is formed.

In the producing method, the large number of cover cords 66 are aligned with each other so as to be formed as cover cord-aligned members, and then each cover cord-aligned member is covered with the corresponding cover topping rubber 68. Accordingly, a sheet-like cover 28 in an unvulcanized state (hereinafter, referred to also as "green cover") is prepared. Then, an electron beam is applied to the green cover, thereby preparing a cover precursor in which the cover topping rubber 68 is slightly vulcanized. The cover precursor is wound around the core 24, and the apex 26 is combined with the core 24 around which the cover precursor has been wound, thereby forming the bead 8. The bead 8 is combined with the other elements, thereby forming the green tire.

In the producing method, the cover topping rubber 68 of the cover 28 included in the green tire is slightly vulcanized. Therefore, even when the green tire is pressurized and heated in the vulcanizing step, the cover topping rubber 68 is effectively inhibited from flowing. The producing method for the tire 2 allows a tire 2 including a cover 28 having an appropriate thickness Tv to be obtained. In the tire 2, since the distance between the core 24 and the carcass cord 56 is reliably ensured, fretting between the core 24 and the carcass cord 56 is effectively prevented. Thus, in the tire 2, occurrence of a damage of CBU is more effectively inhibited. From this viewpoint, it is preferable that the cover 28 of the tire 2 is obtained by pressurizing and heating, in a mold, the cover precursor which is obtained by applying an electron beam to the green cover. In other words, the cover 28 is preferably a vulcanization-molded product of an electron beam-applied member of the cover 28 in an unvulcanized state.

In the producing method, the voltage of the electron beam to be applied is preferably not lower than 200 kV and not higher than 600 kV from the viewpoint of effectively reducing the fluidity of the cover topping rubber 68 in the vulcanizing step. The amount of the electron beam to be applied is preferably not lower than 50 kGy and not higher than 200 kGy. Examples of a device for electron beam application include a scan-type electron beam applying device and an area-type electron beam applying device.

Figure 4:
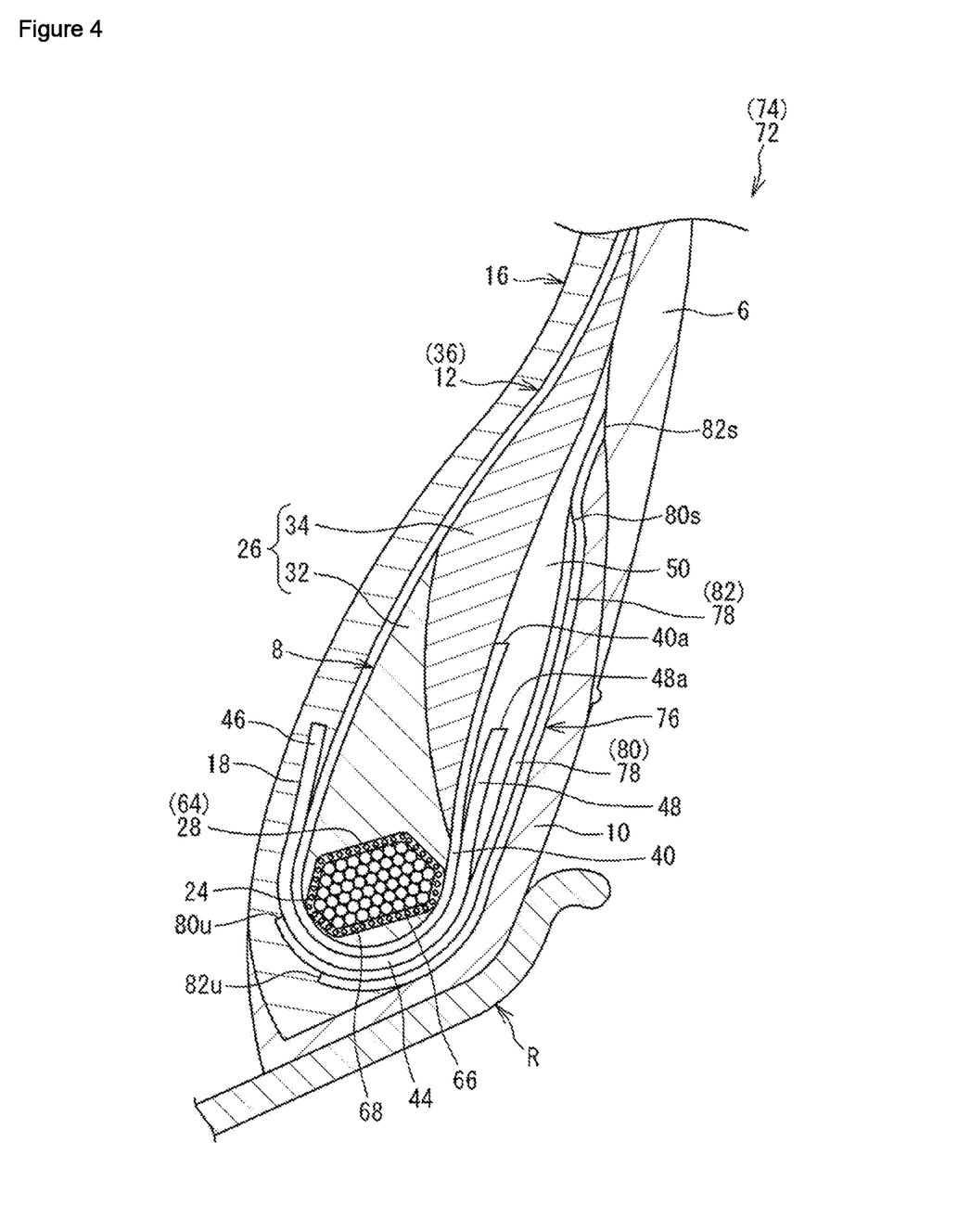
FIG. 4 is a partial cross-sectional view of a heavy-duty pneumatic tire according to another embodiment of the present invention.

FIG. 4 shows a fitted portion 74 of a heavy-duty pneumatic tire 72 according to another embodiment of the present invention (hereinafter, sometimes referred to simply as "tire 72"). FIG. 4 shows a partial cross section of the tire 72 taken along a plane that includes a rotation axis of the tire 72. In FIG. 4, the right-left direction is the axial direction of the tire 72, and the up-down direction is the radial direction of the tire 72. A direction perpendicular to the sheet surface of FIG. 4 is the circumferential direction of the tire 72.

The tire 72 has the same configuration as that of the tire 2 shown in FIG. 1, except that the fitted portion 74 thereof includes a second reinforcing layer 76 instead of the inner sidewall 52. In FIG. 4, the same elements as the elements of the tire 2 shown in FIG. 1 are denoted by the same reference characters, and description thereof is omitted.

The tire 72 includes a pair of second reinforcing layers 76. Each second reinforcing layer 76 is located axially outward of the corresponding bead 8, and covers an axially outer portion of the corresponding reinforcing layer 18 (hereinafter, "reinforcing steel layer 18"), specifically, the end 48a of the outer portion 48.

Although not shown, the second reinforcing layer 76 includes a large number of aligned second filler cords. Each second filler cord is formed from an organic fiber. Examples of the organic fiber include nylon fibers, rayon fibers, polyester fibers, and aramid fibers. The second reinforcing layer 76 is referred to also as a reinforcing fiber layer 76.

The reinforcing fiber layer 76 is composed of at least two reinforcing plies 78. The reinforcing fiber layer 76 of the tire 72 is composed of two reinforcing plies 78 which are an inner reinforcing ply 80 and an outer reinforcing ply 82. In the tire 72, each reinforcing ply 78 includes a large number of aligned second filler cords.

The inner reinforcing ply 80 is in contact with the reinforcing steel layer 18. An outer end 80s of the inner reinforcing ply 80 is located radially outward of the end 48a of the outer portion 48 which is a part of the reinforcing steel layer 18. The inner reinforcing ply 80 covers the end 48a of the outer portion 48 from the axially outer side. An inner end 80u of the inner reinforcing ply 80 is located axially inward of the core 24. The inner end 80u of the inner reinforcing ply 80 overlaps the core 24 in the axial direction.

The outer reinforcing ply 82 is in contact with the inner reinforcing ply 80. An outer end 82s of the outer reinforcing ply 82 is located radially outward of the outer end 80s of the inner reinforcing ply 80. The outer reinforcing ply 82 covers the outer end 80s of the inner reinforcing ply 80 from the axially outer side. An inner end 82u of the outer reinforcing ply 82 is located axially outward of the inner end 80u of the inner reinforcing ply 80 and located radially inward of the core 24.

The tire 72 is the same as the tire 2 shown in FIG. 1 in that: the cover 28 is composed of the one cover ply 64 including the large number of aligned cover cords 66; the ratio of the distance W between the cover cords 66 to the outer diameter d of the carcass cord 56 (W/d) is not lower than 0.35 and not higher than 0.85; and the difference between the hardness Hv of the cover topping rubber 68 covering the cover cords 66 and the hardness Ht of the carcass topping rubber 58 covering the carcass cords 56 (Hv-Ht) is not less than −5 and not greater than 5.

In the tire 72, not only occurrence of a damage of CBU but also occurrence of pulling-out of the carcass ply 36 is inhibited. Therefore, the tire 72 has excellent durability.

Furthermore, in the tire 72, the reinforcing fiber layer 76 contributes to the rigidity of the fitted portion 74. In particular, the reinforcing fiber layer 76 effectively restricts, together with the reinforcing steel layer 18, movement of the core 24. Accordingly, rotation of the core 24 is inhibited, and thus occurrence of bead core looseness is effectively inhibited. Therefore, occurrence of pulling-out of the carcass ply 36 is effectively inhibited, whereby the durability of the tire 72 can be further improved.

Figure 5:
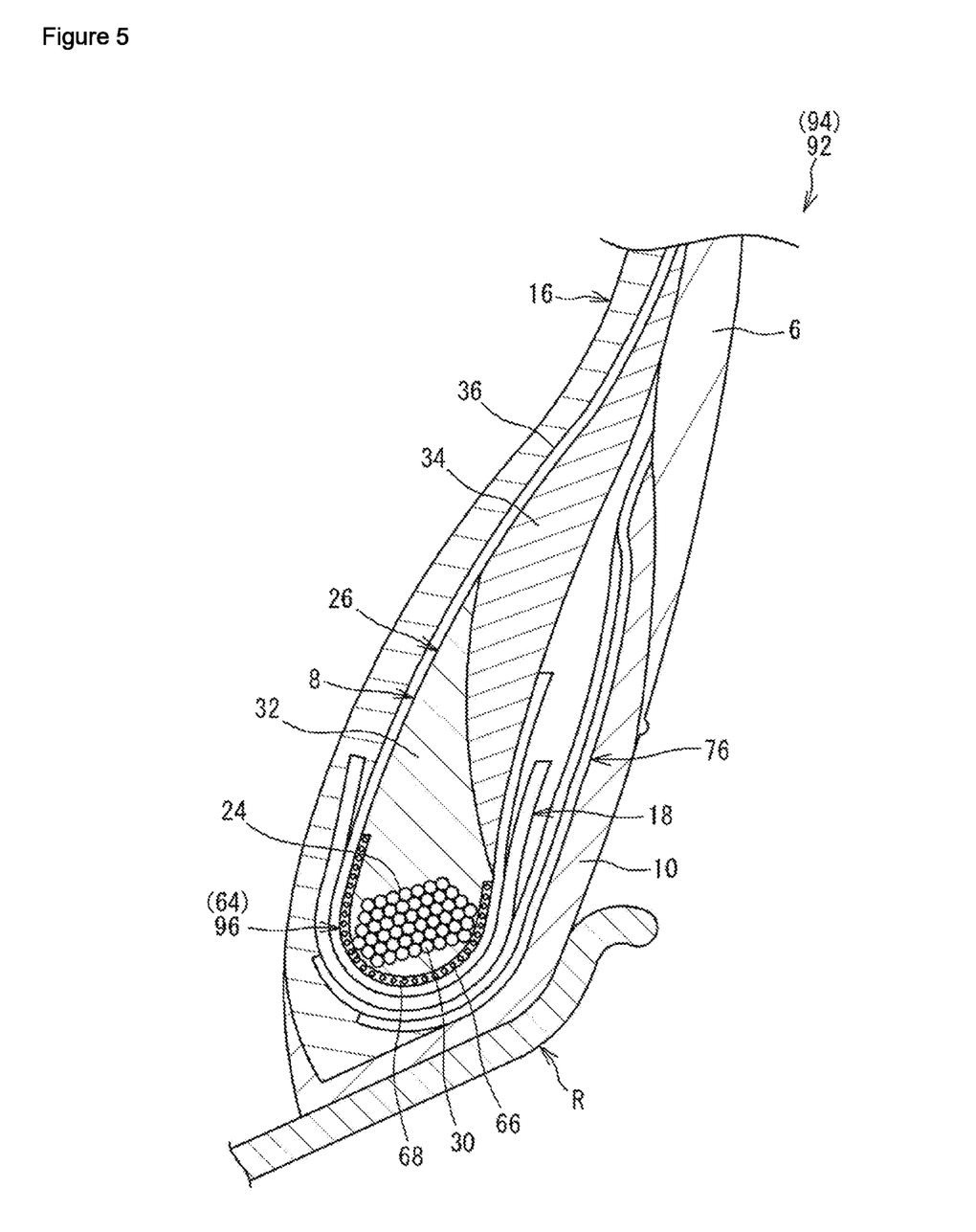
FIG. 5 is a partial cross-sectional view of a heavy-duty pneumatic tire according to still another embodiment of the present invention.

FIG. 5 shows a fitted portion 94 of a heavy-duty pneumatic tire 92 according to another embodiment of the present invention (hereinafter, sometimes referred to simply as "tire 92"). FIG. 5 shows a partial cross section of the tire 92 taken along a plane that includes a rotation axis of the tire 92. In FIG. 5, the right-left direction is the axial direction of the tire 92, and the up-down direction is the radial direction of the tire 92. A direction perpendicular to the sheet surface of FIG. 5 is the circumferential direction of the tire 92.

The tire 92 has the same configuration as that of the tire 72 shown in FIG. 4, except that a cover 96 of the fitted portion 94 thereof has a different configuration. In FIG. 5, the same elements as the elements of the tire 72 shown in FIG. 4 are denoted by the same reference characters, and description thereof is omitted.

The cover 96 is the same as the cover 28 shown in FIG. 1 and FIG. 4 in that the cover 96 is composed of the one cover ply 64 including the large number of aligned cover cords 66 and further including the cover topping rubber 68 covering the cover cords 66. Each cover cord 66 is a cord formed from an organic fiber. The cover topping rubber 68 is formed from crosslinked rubber.

In the tire 92, the cover 96 does not enclose the entire core 24 but encloses a part of the core 24. As shown in FIG. 5, the cover 96 is disposed so as to face an axially inner portion, a radially inner portion, and an axially outer portion of the core 24. In the tire 92, the inner apex 32 is placed on the core 24 without the cover 96 being interposed between the inner apex 32 and a radially outer portion of the core 24.

Each bead 8 of the tire 92 shown in FIG. 5 is formed as follows. The wires 30 are spirally wound to be formed as the cores 24. Each apex 26 is combined with the corresponding core 24, and then the aforementioned cover precursor is attached so as to enclose the core 24 portion. Accordingly, the bead 8 is formed. A green tire including the bead 8 is prepared, and the green tire is pressurized and heated in a mold, thereby obtaining the tire 92 including the fitted portion 94 shown in FIG. 5.

The tire 92 is the same as the tire 2 in FIG. 1 and the tire 72 in FIG. 4 in that the cover 96 is located, between the core 24 and the carcass ply 36, in the portion at which the carcass ply 36 encloses the core 24. Since the cover 96 is interposed between the core 24 and the carcass ply 36, fretting between the core 24 and the carcass cord 56 is prevented.

In the tire 92, the core 24 is not wrapped by the cover 96. In the tire 92, rotational movement of the core 24 in a running state is more effectively inhibited than in the tire 2 in FIG. 1 and the tire 72 in FIG. 4. Moreover, as in the tire 2 in FIG. 1 and the tire 72 in FIG. 4, the ratio of the distance W between the cover cords 66 to the outer diameter d of the carcass cord 56 (W/d) is not lower than 0.35 and not higher than 0.85, and the difference between the hardness Hv of the cover topping rubber 68 covering the cover cords 66 and the hardness Ht of the carcass topping rubber 58 covering the carcass cords 56 (Hv-Ht) is not less than −5 and not greater than 5.

In the tire 92, not only occurrence of a damage of CBU but also occurrence of pulling-out of the carcass ply 36 is inhibited. Therefore, the tire 92 has excellent durability.

As is obvious from the above description, according to the present invention, a heavy-duty pneumatic tire in which not only occurrence of a damage of CBU but also occurrence of pulling-out of the carcass ply can be inhibited and which has excellent durability, is obtained.

The embodiments disclosed herein are in all aspects illustrative and not restrictive. The technological scope of the present invention is not limited to the aforementioned embodiments, but includes all modifications within a scope equivalent to the configurations described in the claims.

EXAMPLES

Hereinafter, the present invention will be described in more detail by means of examples and the like. However, the present invention is not limited to the examples alone.

Example 1

A heavy-duty pneumatic tire (tire size=295/80R22.5) having the configuration shown in FIG. 1 and conforming to the specifications indicated in Table 1 below, was obtained.

Each fitted portion in Example 1 has the configuration shown in FIG. 1, as indicated in the row "Configuration" in Table 1. In Example 1, the entire cores were enclosed by the covers. Each cover was composed of one cover ply, and the thickness Tv of the cover ply was 1.0 mm. As each cover cord, a nylon fiber cord having a thickness of 940 dtex was used. The hardness Hv of each cover topping rubber was 70. As each carcass cord, a steel cord having an outer diameter d of 0.85 mm was used. The ratio of the distance W between the cover cords to the outer diameter d of the carcass cord (W/d) was 0.65. The hardness Ht of the carcass topping rubber was 71. The difference between the hardness Ht of the carcass topping rubber and the hardness Tv of the cover topping rubber (Ht-Hv) was 1. The hardness Hc of each chafer was 72.

In Example 1, reinforcing steel layers were used, but no reinforcing fiber layer was used. These features are expressed as "Y" in the row "Reinforcing steel layer" and "0" in the row "Reinforcing fiber layer", respectively, in Table 1.

Example 3

A tire in Example 3 was obtained in the same manner as in Example 1, except that each fitted portion was provided with a reinforcing fiber layer so that the fitted portion had the configuration shown in FIG. 4. The reinforcing fiber layer was composed of two reinforcing plies. This feature is expressed as "2" in the row "Reinforcing fiber layer" in Table 1. For each reinforcing ply, nylon fiber cords were used.

Example 2

A tire in Example 2 was obtained in the same manner as in Example 3, except that the reinforcing fiber layer was composed of one reinforcing ply.

Comparative Example 1

A tire in Comparative Example 1 was obtained in the same manner as in Example 1, except that each cover was composed of two cover plies. In Comparative Example 1, a conventional tire was used.

Comparative Example 3

A tire in Comparative Example 3 was obtained in the same manner as in Example 3, except that the cover was composed of two cover plies. In Comparative Example 3, a conventional tire was used.

Comparative Example 2

A tire in Comparative Example 2 was obtained in the same manner as in Example 2, except that the cover was composed of two cover plies. In Comparative Example 2, a conventional tire was used.

Examples 4-7 and Comparative Example 4

Tires in Examples 4-7 and Comparative Example 4 were obtained in the same manner as in Example 1, except that the ratios (W/d) were set as indicated in Table 2 below with different distances W between the cover cords. Production of a tire having a ratio (W/d) lower than 0.35 with a different distance W was attempted. However, it was difficult to form cover plies, and thus such a tire was unable to be produced.

Examples 8 and 9 and Comparative Examples 5 and 6

Tires in Examples 8 and 9 and Comparative Examples 5 and 6 were obtained in the same manner as in Example 1, except that the differences (Ht-Hv) were set as indicated in Table 3 below with different hardnesses Hv.

Examples 10 and 11

Tires in Examples 10 and 11 were obtained in the same manner as in Example 1, except that the differences (Ht-Hv) were set as indicated in Table 3 below with different hardnesses Hv and different hardnesses Ht, and the hardnesses Hc were also set as indicated in Table 3.

Example 12

A tire in Example 12 was obtained in the same manner as in Example 1, except that the differences (Ht-Hv) were set as indicated in Table 3 below with different hardnesses Hv and different hardnesses Ht.

Examples 13 and 14

Tires in Examples 13 and 14 were obtained in the same manner as in Example 1, except that the thicknesses of the cover cords were set as indicated in Table 4 below.

Examples 15 and 16

Tires in Examples 15 and 16 were obtained in the same manner as in Example 1, except that the thicknesses Tv of the cover plies were set as indicated in Table 4 below.

Example 17

A tire in Example 17 was obtained in the same manner as in Example 1, except that each fitted portion had the configuration shown in FIG. 5. In Example 17, a part of the core was enclosed by the cover.

[Durability Test 1]

Each tire was mounted to a rim (size=9.00×22.5), and the inside of the tire was filled with air. The internal pressure of the tire was adjusted to 850 kPa. The tire was set on a drum tester. With a vertical load of 69.54 kN being applied to the tire at a slip angle of 0 (zero) degrees and a camber angle of 0 (zero) degrees, running with the tire was performed at a speed of 20 km/h on the outer circumferential surface of the drum having a diameter of 1707 mm. The time taken before the tire was broken, was measured. The results of the measurement are indicated in Tables 1-4 below. Tires of which the running times had exceeded 450 hours were regarded as passing the test. After the test was ended, the tire was disassembled, and the damage state thereof was checked. The results of the check are indicated in the row "Test 1" in Tables 1-4 below. "PTL" means a damage in which an end of a turned-up portion of the carcass ply is peeled (Ply Turn-up Loose). "CBU" means a damage that involves a break of a carcass cord as described above (Cord Broken Up).

[Durability Test 2]

A durability test was conducted with reference to "Durability Test Method for Tire" described in Japanese Laid-Open Patent Publication No. 2013-257190. Each tire was mounted to the rim (size=9.00×22.5), and the inside of the tire was filled with air. The internal pressure of the tire was adjusted to 850 kPa. The tire was set on the drum tester. With a vertical load of 29.60 kN being applied to the tire at a slip angle of 0 (zero) degrees and a camber angle of 0 (zero) degrees, running with the tire was performed at a speed of 30 km/h on the outer circumferential surface of the drum having a diameter of 1707 mm During the running, each fitted portion was heated by a heater such that the temperature of the fitted portion became 140° C. The time taken before the tire was broken, was measured. The results of the measurement are indicated in Tables 1-4 below. Tires of which the running times had exceeded 150 hours were regarded as passing the test. After the test was ended, the tire was disassembled, and the damage state thereof was checked. The results of the check are indicated in the row "Test 2" in Tables 1-4 below. "PP" means pulling-out of a carcass ply, which is a damage in which the carcass ply is peeled so as to come apart from a core. "BC" means a base crack which is a damage in which a chafer is cracked.

TABLE 1

|  | Comparative Example 1 | Comparative Example 2 | Comparative Example 3 | Example 1 | Example 2 | Example 3 |
|---|---|---|---|---|---|---|
| Configuration | — | — | — | FIG. 1 | — | FIG. 4 |
| Cover ply  Number | 2 | 2 | 2 | 1 | 1 | 1 |
| Cover ply  Tv [mm] | 1.0 | 1.0 | 1.0 | 1.0 | 1.0 | 1.0 |
| W/d [—] | 0.65 | 0.65 | 0.65 | 0.65 | 0.65 | 0.65 |
| Thickness [dtex] | 940 | 940 | 940 | 940 | 940 | 940 |
| Hardness Hv | 70 | 70 | 70 | 70 | 70 | 70 |
| Hardness Ht | 71 | 71 | 71 | 71 | 71 | 71 |
| Ht − Hv | 1 | 1 | 1 | 1 | 1 | 1 |
| Hc | 72 | 72 | 72 | 72 | 72 | 72 |
| Reinforcing steel layer | Y | Y | Y | Y | Y | Y |
| Reinforcing fiber layer | 0 | 1 | 2 | 0 | 1 | 2 |
| Test 1  Time | 480 | 550 | 650 | 500 | 580 | 700 |
| Test 1  Damage | PTL | PTL | PTL | PTL | PTL | PTL |
| Test 2  Time | 80 | 100 | 130 | 180 | 210 | 250 |
| Test 2  Damage | PP | PP | PP | BC | BC | BC |

TABLE 2

|  | Example 4 | Example 5 | Example 6 | Example 7 | Comparative Example 4 |
|---|---|---|---|---|---|
| Configuration | FIG. 1 | FIG. 1 | FIG. 1 | FIG. 1 | FIG. 1 |
| Cover ply  Number | 1 | 1 | 1 | 1 | 1 |
| Cover ply  Tv [mm] | 1.0 | 1.0 | 1.0 | 1.0 | 1.0 |
| W/d [—] | 0.35 | 0.53 | 0.71 | 0.85 | 1.18 |
| Thickness [dtex] | 940 | 940 | 940 | 940 | 940 |
| Hardness Hv | 70 | 70 | 70 | 70 | 70 |
| Hardness Ht | 71 | 71 | 71 | 71 | 71 |
| Ht − Hv | 1 | 1 | 1 | 1 | 1 |
| Hc | 72 | 72 | 72 | 72 | 72 |
| Reinforcing fiber layer | 0 | 0 | 0 | 0 | 0 |
| Test 1  Time | 500 | 500 | 500 | 480 | 300 |
| Test 1  Damage | PTL | PTL | PTL | PTL | CBU |
| Test 2  Time | 180 | 180 | 180 | 175 | 160 |
| Test 2  Damage | BC | BC | BC | BC | BC |

TABLE 3

|  | Comparative Example 5 | Example 8 | Example 9 | Comparative Example 6 | Example 10 | Example 11 | Example 12 |
|---|---|---|---|---|---|---|---|
| Configuration | FIG. 1 | FIG. 1 | FIG. 1 | FIG. 1 | FIG. 1 | FIG. 1 | FIG. 1 |
| Cover ply  Number | 1 | 1 | 1 | 1 | 1 | 1 | 1 |
| Cover ply  Tv [mm] | 1.0 | 1.0 | 1.0 | 1.0 | 1.0 | 1.0 | 1.0 |
| W/d [—] | 0.65 | 0.65 | 0.65 | 0.65 | 0.65 | 0.65 | 0.65 |
| Thickness [dtex] | 940 | 940 | 940 | 940 | 940 | 940 | 940 |
| Hardness Hv | 65 | 68 | 74 | 77 | 75 | 75 | 75 |
| Hardness Ht | 71 | 71 | 71 | 71 | 76 | 78 | 76 |
| Ht − Hv | 6 | 3 | −3 | −6 | 1 | 3 | 1 |
| Hc | 72 | 72 | 72 | 72 | 80 | 80 | 72 |
| Reinforcing steel layer | Y | Y | Y | Y | Y | Y | Y |
| Reinforcing fiber layer | 0 | 0 | 0 | 0 | 0 | 0 | 0 |
| Test 1  Time | 180 | 480 | 450 | 350 | 500 | 480 | 450 |
| Test 1  Damage | CBU | PTL | PTL | CBU | PTL | PTL | PTL |
| Test 2  Time | 160 | 175 | 170 | 100 | 180 | 175 | 170 |
| Test 2  Damage | BC | BC | BC | BC | BC | BC | BC |

TABLE 4

| | Example 13 | Example 14 | Example 15 | Example 16 | Example 17 |
|---|---|---|---|---|---|
| Configuration | FIG. 1 | FIG. 1 | FIG. 1 | FIG. 1 | FIG. 5 |
| Cover ply Number | 1 | 1 | 1 | 1 | 1 |
| Cover ply Tv [mm] | 1.0 | 1.0 | 0.7 | 1.4 | 1.0 |
| W/d [—] | 0.65 | 0.65 | 0.65 | 0.65 | 0.65 |
| Thickness [dtex] | 700 | 1100 | 940 | 940 | 940 |
| Hardness Hv | 70 | 70 | 70 | 70 | 70 |
| Hardness Ht | 71 | 71 | 71 | 71 | 71 |
| Ht − Hv | 1 | 1 | 1 | 1 | 1 |
| Hc | 72 | 72 | 72 | 72 | 72 |
| Reinforcing steel layer | Y | Y | Y | Y | Y |
| Reinforcing fiber layer | 0 | 0 | 0 | 0 | 0 |
| Test 1 Time | 480 | 480 | 480 | 480 | 500 |
| Test 1 Damage | PTL | PTL | PTL | PTL | PTL |
| Test 2 Time | 175 | 175 | 175 | 175 | 180 |
| Test 2 Damage | BC | BC | BC | BC | BC |

As indicated in Tables 1-4, not only occurrence of a damage of CBU but also occurrence of pulling-out of a carcass ply is inhibited in the examples. From the evaluation results, advantages of the present invention are obvious.

The above-described technology for improving durability is applicable to various tires.

What is claimed is:

1. A heavy-duty pneumatic tire comprising:
a pair of beads;
a pair of chafers, each of the chafers is disposed axially outward of a corresponding one of the beads; and
a carcass extending on and between one of the beads and another bead, wherein
each bead includes a core, an apex located radially outward of the core, and a cover enclosing at least a part of the core,
the apex includes an inner apex and an outer apex,
the carcass includes a carcass ply including a plurality of aligned carcass cords and further including a carcass topping rubber covering the carcass cords,
each carcass cord is a steel cord,
the carcass ply is turned up around the core from an inner side to an outer side in an axial direction,
the cover is located, between the core and the carcass ply, in a portion at which the carcass ply encloses the core,
the cover is composed of one cover ply including a plurality of aligned cover cords and further including a cover topping rubber covering the cover cords,
each cover cord is a cord formed from an organic fiber,
a ratio of a distance between the cover cords to an outer diameter of each carcass cord is not lower than 0.35 and not higher than 0.85, wherein the outer diameter of each carcass cord is in a range of 0.85 mm to 1.5 mm,
a difference between a hardness of the cover topping rubber and a hardness of the carcass topping rubber is not less than −5 and not greater than 5,
a hardness of each of the chafers is equal to or higher than the hardness of the carcass topping rubber,
the hardness of the cover topping rubber is lower than the hardness of the carcass topping rubber,
wherein a difference between the hardness of each of the chafers and the hardness of the carcass topping rubber is not less than 1 and not greater than 10,
each of the chafers is softer than the inner apex,
each of the chafers is harder than the outer apex,
the carcass ply that is turned up around the core forms a turned-up portion of the carcass ply, and
a ratio of a height of the turned-up portion to a height of a cross section of the carcass is not lower than 0.15 and not higher than 0.25.

2. The heavy-duty pneumatic tire according to claim 1, wherein the hardness of the cover topping rubber is lower than the hardness of the carcass topping rubber.

3. The heavy-duty pneumatic tire according to claim 1, wherein the hardness of the cover topping rubber is not lower than 62 and not higher than 75.

4. The heavy-duty pneumatic tire according to claim 1, wherein a thickness of the cover ply is not smaller than 0.7 mm and not larger than 1.4 mm.

5. The heavy-duty pneumatic tire according to claim 1, wherein a thickness of each cover cord is not lower than 700 dtex and not higher than 1300 dtex.

6. The heavy-duty pneumatic tire according to claim 1, wherein an angle of each cover cord relative to a circumferential direction is not smaller than 25° and not larger than 75°.

7. The heavy-duty pneumatic tire according to claim 1, wherein an angle of each carcass cord relative to an equator plane of the heavy-duty pneumatic tire is not smaller than 70° and not larger than 90°, and
an angle of each cover cord relative to a circumferential direction is not smaller than 35° and not larger than 65°.

8. The heavy-duty pneumatic tire according to claim 1, wherein the hardness of each of the chafers is not lower than 60 and not higher than 85.

9. The heavy-duty pneumatic tire according to claim 1, wherein a hardness of the inner apex is not lower than 80 and not higher than 95, and
a hardness of the outer apex is not lower than 50 and not higher than 65.

10. The heavy-duty pneumatic tire according to claim 1, wherein the cover encloses only the part of the core.

11. The heavy-duty pneumatic tire according to claim 1, wherein the cover is U-shaped.

12. The heavy-duty pneumatic tire according to claim 1, wherein the cover is disposed so that at least a portion of a top side of the core remains uncovered by the cover.

* * * * *